UNITED STATES PATENT OFFICE.

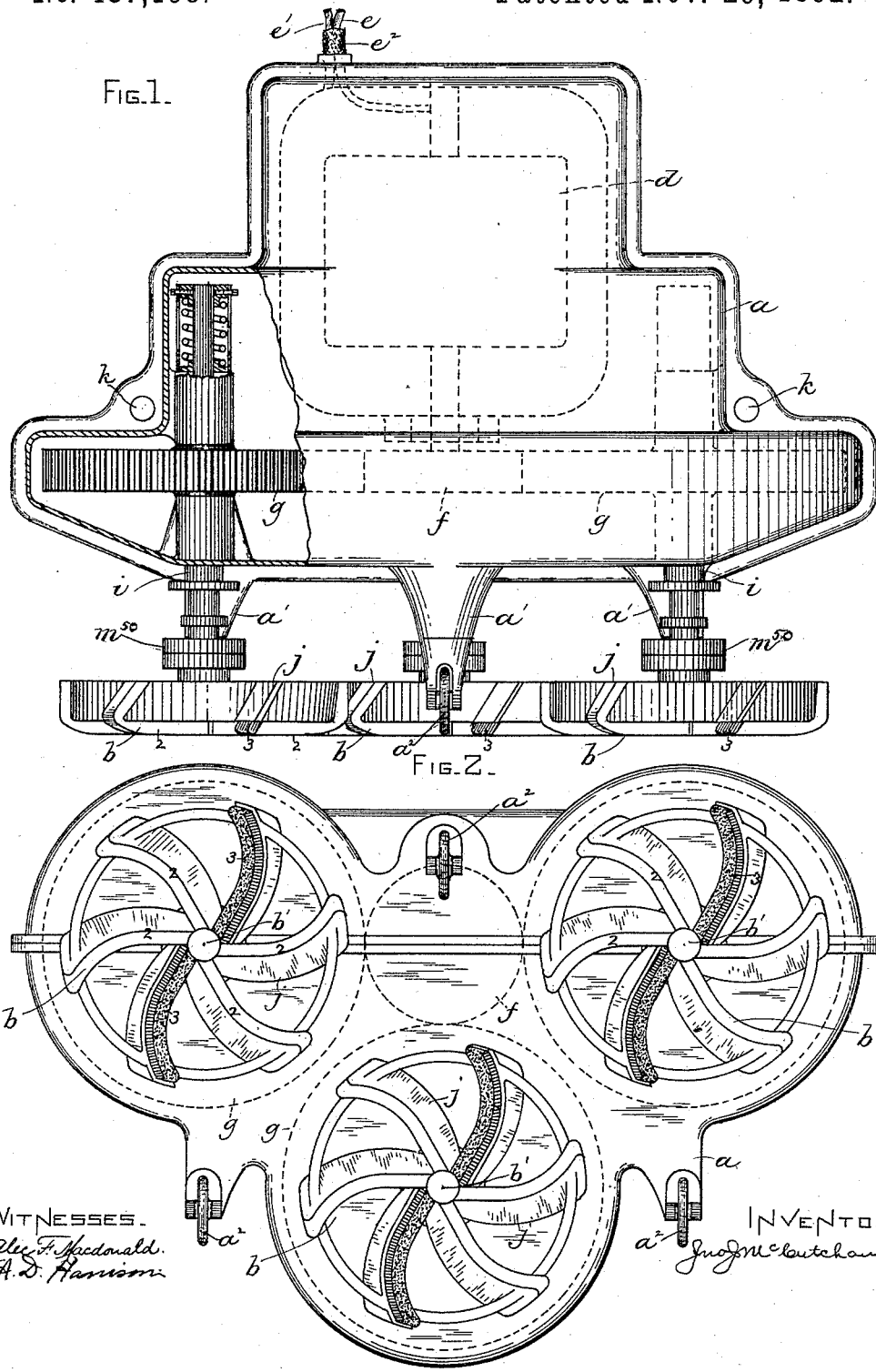

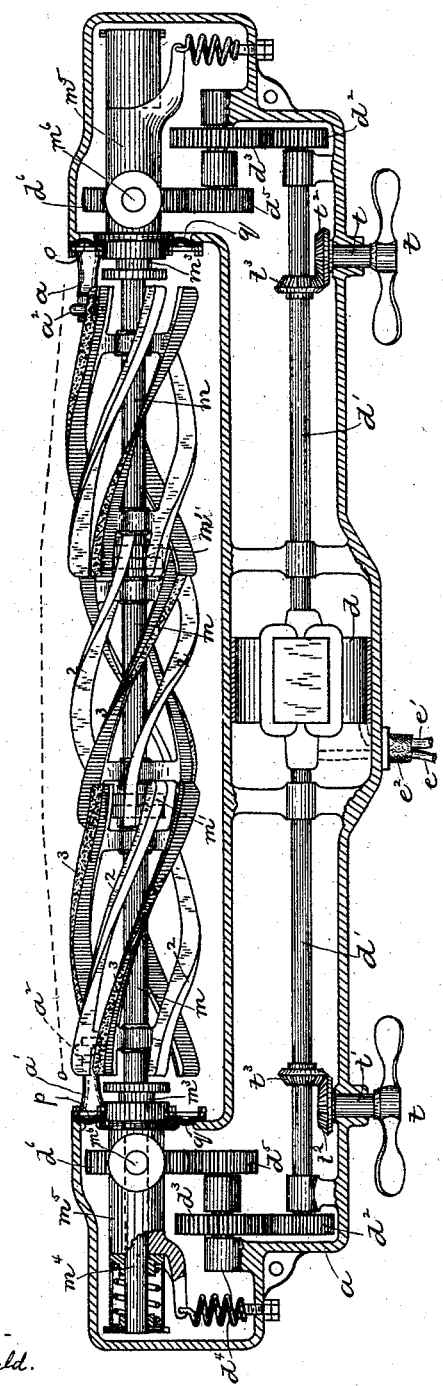

JOHN J. McCUTCHAN, OF LYNN, MASSACHUSETTS.

APPARATUS FOR CLEANING SHIPS' BOTTOMS.

SPECIFICATION forming part of Letters Patent No. 487,198, dated November 29, 1892.

Application filed March 28, 1892. Serial No. 426,740. (No model.)

*To all whom it may concern:*

Be it known that I, JOHN J. MCCUTCHAN, of Lynn, in the county of Essex and State of Massachusetts, have invented certain new and useful Improvements in Apparatus for Cleaning the Bottoms of Ships, of which the following is a specification.

This invention has for its object to provide an apparatus for cleaning the surface of ships' hulls and removing the barnacles, &c., therefrom below the surface of the water, thus avoiding the necessity of dry-docking a ship for cleaning purposes.

The invention consists in a cleaning apparatus comprising a portable frame or holder adapted to be moved upon the surface of a ship's hull below the water, a movable cleaning device on said frame, a motor carried by the frame and adapted to operate the cleaning device, and a propeller driven by the motor and arranged to act on the surrounding water in such manner as to drive the cleaning device inwardly toward the hull, and thus cause it to act on the incrustations or foreign matter, all of which I will now proceed to describe and claim.

Of the accompanying drawings, forming a part of this specification, Figure 1 represents a top view of a cleaning apparatus embodying my invention. Fig. 2 represents a side elevation of the same. Fig. 3 represents a top view of a different form of apparatus embodying my invention, portions of the casing in Figs. 1 and 3 being shown in section, the same letters and numerals of reference indicating the same parts in all the figures.

In the drawings, $a$ represents a portable casing, which is provided with projections $a'$, adapted to bear on the side of a ship's hull, said projections preferably including trucks or wheels $a^2$, adapted to roll upon the surface of the hull and facilitate the movements of the apparatus hereinafter described.

$b$ $b$ $b$ represent rotary cleaning devices mounted upon shafts $b'$ $b'$ $b'$, which are journaled in bearings on the casing $a$. There may be one or more of said cleaning devices and each cleaning device may be of any suitable construction.

In Figs. 1 and 2 I show each cleaning device as composed of a series of substantially-radial blades or cutters 2 2 2, adapted to cut away barnacles and other foreign matter adhering to the surface of the hull, and one or more intermediate brushes 3, having the same general form and arrangement as blades 2; but it will be understood that the cleaning device may be composed entirely of cutting-blades or entirely brushes or may be of any other construction adapted to clean the surface of the hull of a ship. The casing $a$ is provided with a water-tight chamber inclosing an electric motor $d$, which may be of any suitable form and construction, and is adapted to be operated by an electric current through wires $e$ $e'$, one of which may be connected to the field and the other to the commutator of the motor in the usual way. Said wires are arranged in a cable $e^2$ and extend to a dynamo or other source of electricity on board the ship. The shaft of the motor is connected by gears $f$ $g$ with the shafts $b'$ of the cleaning device. The motor and gearing above described are preferably inclosed in a water-tight chamber, the shafts $b'$ of the cleaning device extending through the stuffing-box $i$ on the casing.

Suitable propellers are provided adapted to be driven by the motor and to act upon the water in such manner as to force the cleaning device inwardly toward the hull of the vessel. In Figs. 1 and 2 I show said propellers as composed of blades $j$, which are integral with the cutters $b$, said blades being in this case rearward extensions of said cutters, arranged diagonally, so that by the rotation of the cleaning devices the blades will be caused to impinge upon the water, and thus exert pressure against the cleaning devices, forcing the latter inwardly against the hull.

The apparatus above described may be operated as follows: Suitable cords or ropes are connected to the casing at eyes or orifices $k$ $k$, formed in suitable parts of the casing, said cords or ropes being of sufficient length to permit the operator or operators standing on the deck of the vessel to lower the casing into the water and allow it to reach the bottom of the hull. When the casing is dropped into the water, the propellers, acting on the water, force the cleaning devices inwardly against the surface of the hull. The operator by letting out or taking up the supporting-ropes may raise or lower the apparatus, thus causing it to act on any desired portion or portions of the hull.

The wheels $a^2$, in rolling contact with the surface of the hull, prevent the cleaning devices from injuring the surface of the hull after having removed the barnacles therefrom.

In Fig. 3 I show a different form of apparatus, in which the cleaning device is composed of blades 2 or alternating blades 2 and brushes 3 of helical form, the arrangement of said blades and brushes being similar to that of the blades of lawn-mowers. In this case I show the cleaning device composed of a series of sections, each comprising a shaft $m$, to which the helical blades are attached by suitable arms connected to the shafts. The shafts are arranged end to end and are connected at $m'$ by flexible couplings, which enable the shafts to move out of line with each other, so that the cleaning devices may conform to contours of the general shape indicated by dotted lines $o\ o$ in Fig. 3 or other irregular contours, such as will be presented by the various parts of the hull of a vessel. The end shafts $m\ m$ are connected by flexible couplings $m^3$ with shafts $m^4$, journaled in bearings $m^5$, which are pivoted at $m^6$ to the frame or casing $a$ and are adapted to swing sufficiently to permit the described conformity of the cleaning device to the surface of the hull. The entrance of water into the casing around the shafts $m^4$ is prevented by flexible diaphragms $p$, the outer edges of which are connected to the casing $a$, while their inner edges are connected to collars on the shafts $m^4$, said diaphragms closing the openings $q\ q$ in the casing, through which the shafts $m^4$ pass. The motor $d$ has its shaft $d'$ extended in two directions and provided with gears $d^2$ at its ends, meshing with gears $d^3$, affixed to shafts journaled in bearings $d^4$ and provided with gears $d^5$, meshing with gears $d^6$ on the shafts $m^4$. The propellers are in this case shown at $t\ t$ and are composed of suitably-formed blades affixed to shafts $t'$, journaled in bearings in the casing $a$ and provided at their inner ends with beveled gears $t^2$, meshing with corresponding gears $t^3$ on the shaft $d'$. The casing is in this case provided with projections $a'$, having wheels or trucks $a^2$ arranged to bear upon the hull of the vessel.

Other modifications may be made in the form and arrangement of the parts of my improved apparatus without departing from the spirit of the invention.

The shafts of the cleaning devices, formed and arranged as shown in Figs. 1 and 2, may be provided with flexible couplings at $m^{50}$, adapted to permit the said cleaning devices to oscillate, and thus conform to the curvature or angle of the particular portion of the surface of the hull on which it may be acting.

I claim—

1. In an apparatus for cleaning the bottoms of ships, the combination of a portable frame or holder adapted to be moved upon the surface of a ship's hull, a movable cleaning device on said frame, a motor carried by the frame and connected with said cleaning device, and a propeller driven by said motor and arranged to act on the water supporting the hull and thereby press the cleaning device inwardly against the hull, as set forth.

2. An apparatus for cleaning the bottoms of ships, the same comprising in its construction a frame adapted to be moved upon the surface of a ship's hull, a series of rotary cleaning devices journaled in bearings on said frame, an electric motor supported by the frame, connections between the motor and the shafts of the cleaning devices, and propeller-blades forming parts of said cleaning devices and adapted to force the latter toward the hull, as set forth.

3. An apparatus for cleaning the bottoms of ships, the same comprising in its construction a frame adapted to be moved upon the surface of a ship's hull, a series of rotary cleaning devices journaled in bearings on said frame, an electric motor supported by the frame, connections between the motor and the shafts of the cleaning devices, propeller-blades forming parts of said cleaning devices and adapted to force the latter toward the hull, and projections on the frame adapted to limit the approach of the cleaning devices toward the surface of the hull, as set forth.

4. In an apparatus for cleaning the bottoms of ships, the combination of a portable frame or holder, a movable or rotary cleaning device on said frame, an electric motor supported by the frame, a sectional shaft connecting the motor with the cleaning device, and flexible couplings connecting the parts of said shaft, whereby the cleaning device may be turned or oscillated independently of the motor, as set forth.

In testimony whereof I have signed my name to this specification, in the presence of two subscribing witnesses, this 25th day of March, A. D. 1892.

JNO. J. McCUTCHAN.

Witnesses:
WILLIAM D. HILLS,
ROBERT L. CROSSMAN.